United States Patent
Yamamoto

(10) Patent No.: US 6,600,500 B1
(45) Date of Patent: Jul. 29, 2003

(54) MULTI-WINDOW DISPLAY SYSTEM AND METHOD FOR DISPLAYING AND ERASING WINDOW

(75) Inventor: Kimiyasu Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/559,761

(22) Filed: Apr. 27, 2000

(30) Foreign Application Priority Data

May 18, 1999 (JP) .......................................... 11-137818

(51) Int. Cl.[7] ................................................ G09G 5/00
(52) U.S. Cl. ...................... 345/795; 345/779; 345/790; 345/797
(58) Field of Search ................................ 345/779–783, 345/790–794, 795–797

(56) References Cited

U.S. PATENT DOCUMENTS

| | | | | |
|---|---|---|---|---|
| 5,412,400 A | * | 5/1995 | Takahara et al. | 345/788 |
| 5,900,873 A | | 5/1999 | Isoda et al. | |
| 6,025,841 A | * | 2/2000 | Finkelstein et al. | 345/803 |
| 6,237,045 B1 | * | 5/2001 | Enomoto | 706/11 |
| 6,512,529 B1 | * | 1/2003 | Janssen et al. | 345/790 |

FOREIGN PATENT DOCUMENTS

| | | |
|---|---|---|
| JP | 3-043824 A | 2/1991 |
| JP | 05-241760 | 9/1993 |
| JP | 06-214744 | 8/1994 |
| JP | 07-072857 | 8/1995 |
| JP | 8-171476 A | 7/1996 |
| JP | 8-320777 A | 12/1996 |
| JP | 8-328803 A | 12/1996 |
| JP | 9-091111 A | 4/1997 |
| JP | 9-190329 A * | 7/1997 |
| JP | 10-177465 A | 6/1998 |

* cited by examiner

*Primary Examiner*—Ba Huynh
(74) *Attorney, Agent, or Firm*—Foley & Lardner

(57) ABSTRACT

A multi-window display system is provided, capable of displaying only selected windows on the screen, erasing unnecessary information from the screen, and redisplaying the erased information without restarting the application. In the multi-window display system, when the window 2 is started, the focus moves to the window 2, which is displayed on the uppermost layer of the screen as an operation window. There is a window 1, which is partially or totally covered by the window 2 displayed on the uppermost layer, and another window remains uncovered. With reference to a data base storing the overlapping state of each of the windows, the window 1 which is partially or totally covered by the window 2 is erased, if the data base is not updated for a predetermined time, which results in improving the visibility of the screen. In addition, the erased window 1 can be redisplayed by means of a task bar mechanism.

20 Claims, 7 Drawing Sheets

MULTI-WINDOW DISPLAY SYSTEM AND METHOD FOR DISPLAYING AND ERASING WINDOW

BACKGROUND OF THE INVENTION

1. Field of the Invention

The present invention relates to a multi-window display system, which is capable of automatically highlighting a window to be operated and erasing or regenerating windows when necessary, among multiple windows displayed on a computer screen.

2. Background Art

"Graphical User Interface" was first introduced into the market by Apple, adopted in the "window"-style program by Microsoft, and adopted in the OS/2 and the Presentation Manager by IBM. The computer system which uses the "Graphical User Interface" has been recently introduced in this field. One of general features of the "Graphical User Interface" is that this system allows displaying multiple windows or multiple display of windows simultaneously on a computer display screen. That is, multiple application programs can be executed (or wait for user's input) in parallel in each computer screen which displays multiple application programs. It is also possible to generate a plurality of windows using a single application program. Therefore, a user can execute many different tasks while using many different windows. Although conventional operating systems such as DOS can execute and display only one application program at one time, the Graphical User Interface is provided with many features which are superior to conventional operating systems.

However, such new additional functions of the multi-window display system imposes a new burden on users. That is, the Graphical User Interface is capable of displaying almost infinite numbers of windows, but too many windows make their identification by the use difficult. In fact, a majority of windows are possibly partially or totally covered by other windows. Although this type of problem may arise even when the number of windows is 2 or more, but the problem becomes more conspicuous when the number of windows increases. When some of the windows are partially or totally covered by other windows, a majority of covered windows may not be detected if various operations are not executed. Therefore, it becomes practically difficult to use multiple windows at the same time.

Since the above-mentioned limitation for the Graphical User Interface practically restricts the number of applications or tasks which can be displayed or provided in parallel on the computer screen, such a limitation is likely to destroy the merit or the objective of the Graphical User Interface. In other words, when the computer is started as a new working space, the windows are displayed in line with a size and a position determined in advance by the initial values of each application. However, since there is a limit in displaying many windows without overlapping each other, sometimes one window becomes located above other windows, and the window above other windows partially or totally covers the underlying windows.

Since control information of a window is located within the frame of the window, a user cannot use information located outside of the window frame. Therefore, a window must be highlighted in order to make a user aware of a particular window. A few measures are provided to highlight the window, such as by decorating the window frame or by converting the title letters into reversed letter images. However, these emphasizing measures becomes less effective when the surrounding information becomes more complicated.

An example of a multi-window display system which can solve the above-described problems is disclosed in Japanese Unexamined Patent Application, First Publication No. Hei 6-214744. This publication uses a defocus technique for highlighting the window used for an operation by executing the defocus treatment for the display area, excluding the window to be highlighted. By so doing, the amount of information in the area except for the one widow is reduced so that the window is highlighted as an operation space. Furthermore, Japanese Unexamined Patent Application, First Publication No. Hei 9-190329, discloses a technique that, in a screen including a plurality of windows, if there is a window which has not been used for a predetermined time, this window screen is minimized into an icon image for being displayed at a specified location on the screen.

However, conventional techniques such as the technique disclosed in Japanese Unexamined Patent Application, First Publication No. Hei 6-214744 have following problems. That is, the first problem is that this technique enhances the visibility of the necessary window by defocusing other window area in the screen by using the defocus technique, excluding the concerned window, when a plurality of windows is displayed. In this case, although the display area excluding this window is defocused for highlighting the window, information displayed in the display area other than this window sometimes still bothers the user. Another problem is that this technique does not solve the problem when a user intentionally opens a plurality of windows for referring to contents of these windows. The technique disclosed in Japanese Unexamined Patent Application, First Publication No. Hei 9-190329 also has a problem that it is not possible to carry out a parallel operation referring to a plurality of windows opened at the same time.

SUMMARY OF THE INVENTION

It is therefore an objective of the present invention to solve the above problems in operating systems provided with a function to display a plurality of windows and to provide a system capable of automatically erasing unnecessary windows. Furthermore, the present invention provides a multi-window display system capable of displaying only windows selected by the user, automatically erasing unnecessary windows from the screens, and also capable of re-displaying the once erased information without necessitating a restarting operation for the application.

The present invention relates to operating systems having a function capable of displaying a plurality of windows and the present invention provides a multi-window display system, capable of displaying a necessary window at a top layer of a screen, automatically erasing any unnecessary windows, and then re-displaying them. Thus, it is possible for the multi-window display system of the present invention to improve the visibility of an operating area by displaying one or a plurality of windows activated by the user as the working space and erasing displays of other windows. In addition, when the erased windows are desired to be opened, the desired windows can be opened without having to restart the application system.

The first aspect of the present invention provides a multi-window display system, capable of displaying a plurality of windows on a computer screen, comprising: a detection program for detecting a focused window on which a focus is placed among a plurality of windows; a data base for storing information related to locations of all windows on the screen, information as to whether there are windows which mutually overlap other windows, and information as to whether there are indications for windows; an addition program for detecting information on location of the focused window and for adding information on the presence of the mutually overlapping windows based on said locative information of the focused window; a timer program provided with a timer for detecting as to whether said data base is updated; an erasure program for erasing a window determined to be unnecessary; and an idle-time set value which optionally sets the time until the unnecessary window is erased; wherein, a window, partially or totally covered by the other window, is erased from the screen when said data base is not updated for a predetermined period of time, and the erased window can be redisplayed by a task bar function when a focus shifts to the erased window.

The second aspect of the present invention provides a method for displaying and erasing windows by the multi-window display system according to the first aspect, wherein the method comprises the steps of; detecting by said detection program a newly focused window and shifting a process from said detection program to said addition program; in said addition program, detecting locative information of said newly focused window, calculating presence of the overlapping windows with said newly focused window based on locative information of all previously registered windows and the newly focused window, and adding the information of the newly focused window, if the newly focused window is a new and not registered window, and updating the data base, if the newly focused window is included in previously registered windows; always monitoring the data base by said timer program and clearing the internal timer value of said timer program when said data base is updated; repetitively making a comparison of said internal timer value with said optionally set idle-time value; shifting a control to said erasure program when said data base is not updated until the time exceeding said optionally set idle-time value; and obtaining information as to whether a window opening at present is the window to be erased with reference to said data base and erasing said window when said window is an object for erasure, in said erasure program.

DETAILED DESCRIPTION OF THE INVENTION

Hereinafter, one embodiment of the present invention is described in detail with reference to the attached drawings.

Figure 1:
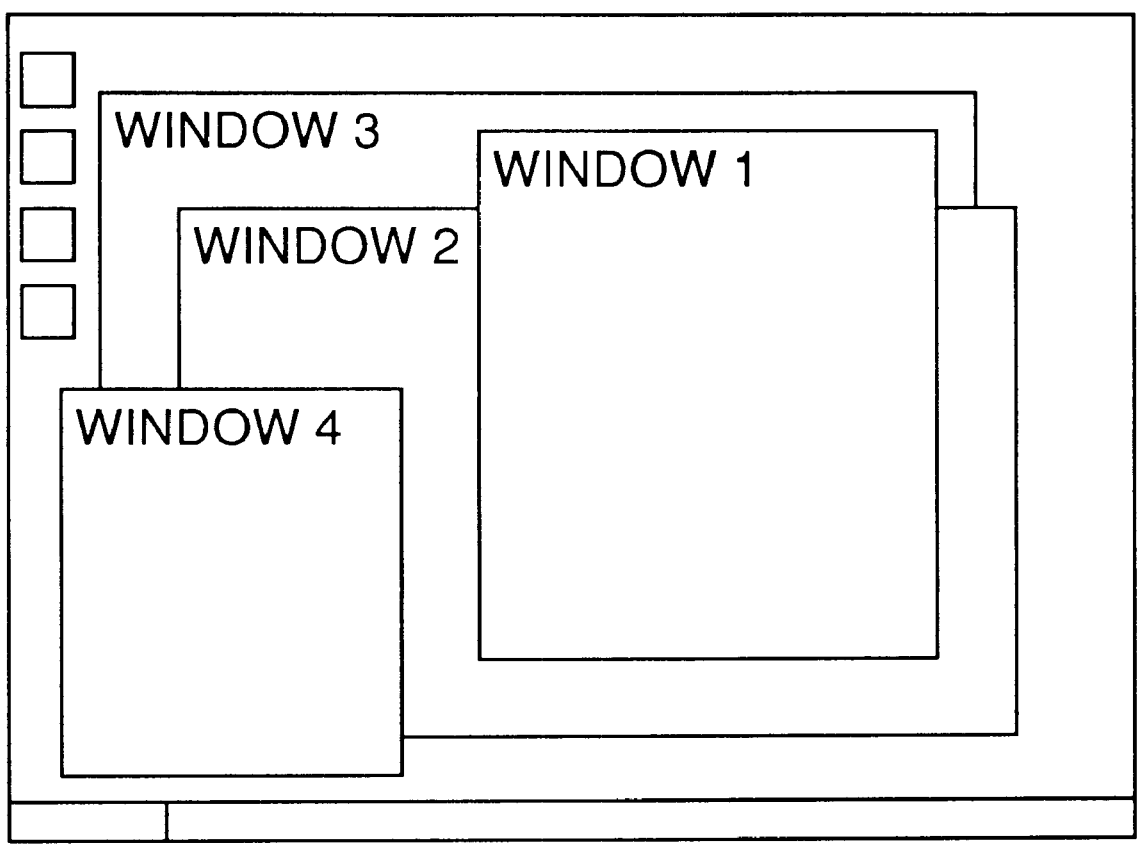
FIG. 1 is a diagram showing a general display screen indicating multi-windows in an operating system having a Graphical User Interface.

FIG. 1 is a diagram showing a general display screen indicating multi-windows in an operating system having a Graphical User Interface. As shown in FIG. 1, in a multi-window screen, many windows such as window 1, 2, and 3 are displayed on a desk-top screen.

Figure 2:
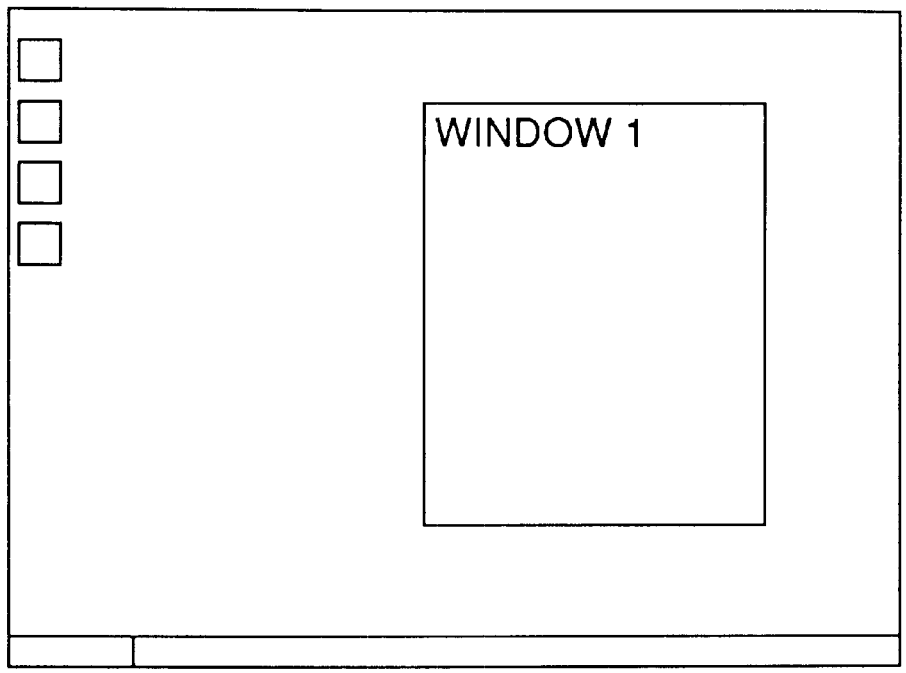
FIG. 2 is a diagram showing a screen displaying a first window immediately after starting an application.

Immediately after an operating system is started, no window is displayed on the desk-top screen, and a window is displayed on the screen as an working space when a user starts an application. FIG. 2 is a diagram showing a screen displaying a first window immediately after starting an application. That is, when the application is started, the first window 1 is displayed on the screen as shown in FIG. 2.

Figure 3:
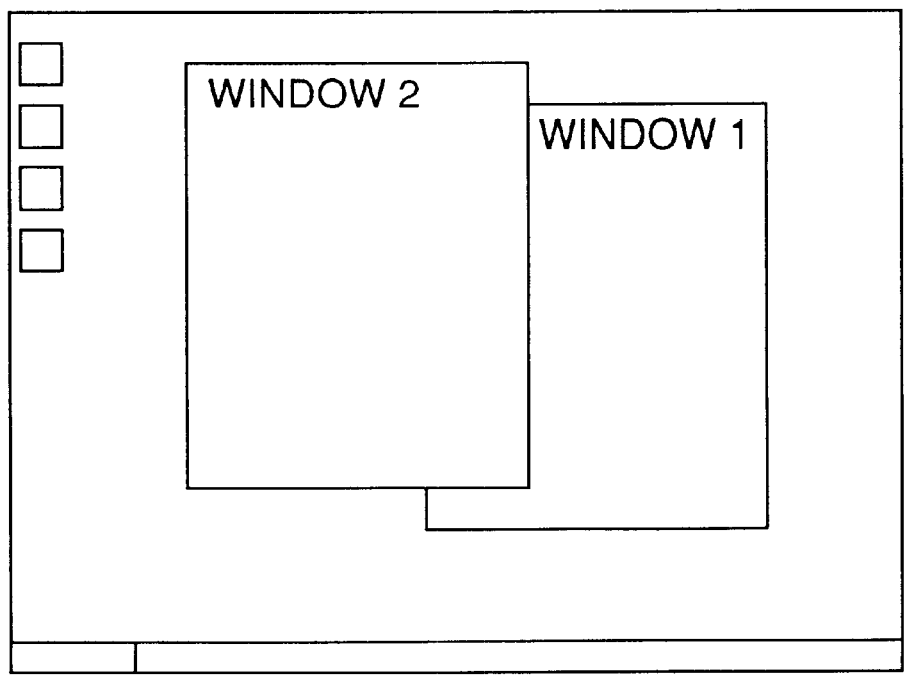
FIG. 3 is a diagram showing a screen displaying a second window after displaying the first window as shown in FIG. 2.

FIG. 3 is a diagram showing a screen displaying a second window after displaying the first window as shown in FIG. 2. When a user wishes to display the second window 2, there is a case that windows overlap with each other, covering information in the hidden window. Although it depends upon the type and the amount of information in the hidden window, information in the window 1 becomes unreadable due to the window 2. The user may arrange two windows on the screen by two following methods.

The first method is adopted when the window 1 need not to be displayed and there is no difficulty is presented when a part or all of the window 1 is covered by the window 2. The second method is adopted when the user works on the window 2 with reference to information of the window 1.

Figure 4:
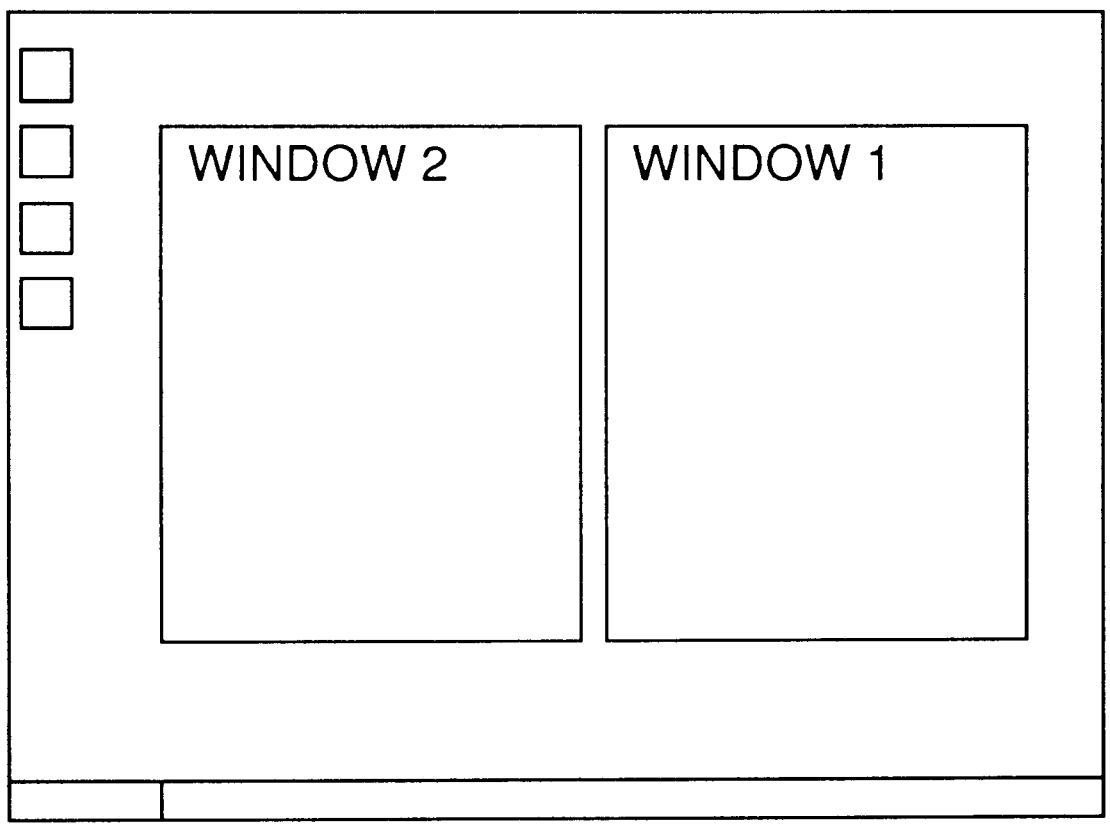
FIG. 4 is a diagram showing two windows displayed in parallel by moving two windows after being displayed as shown in FIG. 3.

FIG. 4 is a diagram showing a display screen in which two windows are displayed in parallel by moving two windows after being displayed as shown in FIG. 3. That is, when the user wishes to use the second method, the user displays both of the two window spaces together on the screen as shown in FIG. 4 by modifying the locations or sizes of two windows. When an application is started, the size and the location of a window is determined based on the initial values defined in the application so that the locations and sizes of two windows are determined mechanically irrespective of an order of starting applications and two windows are placed in either overlapped or adjacent positions.

In a case using the second method, the present invention sets a time required for modifying the location and the size of the window. Accordingly, when a user detects that a new window appears overlapping another window, the user can spend time to modify the new window without erasing the underlying window instantly.

Figure 5:
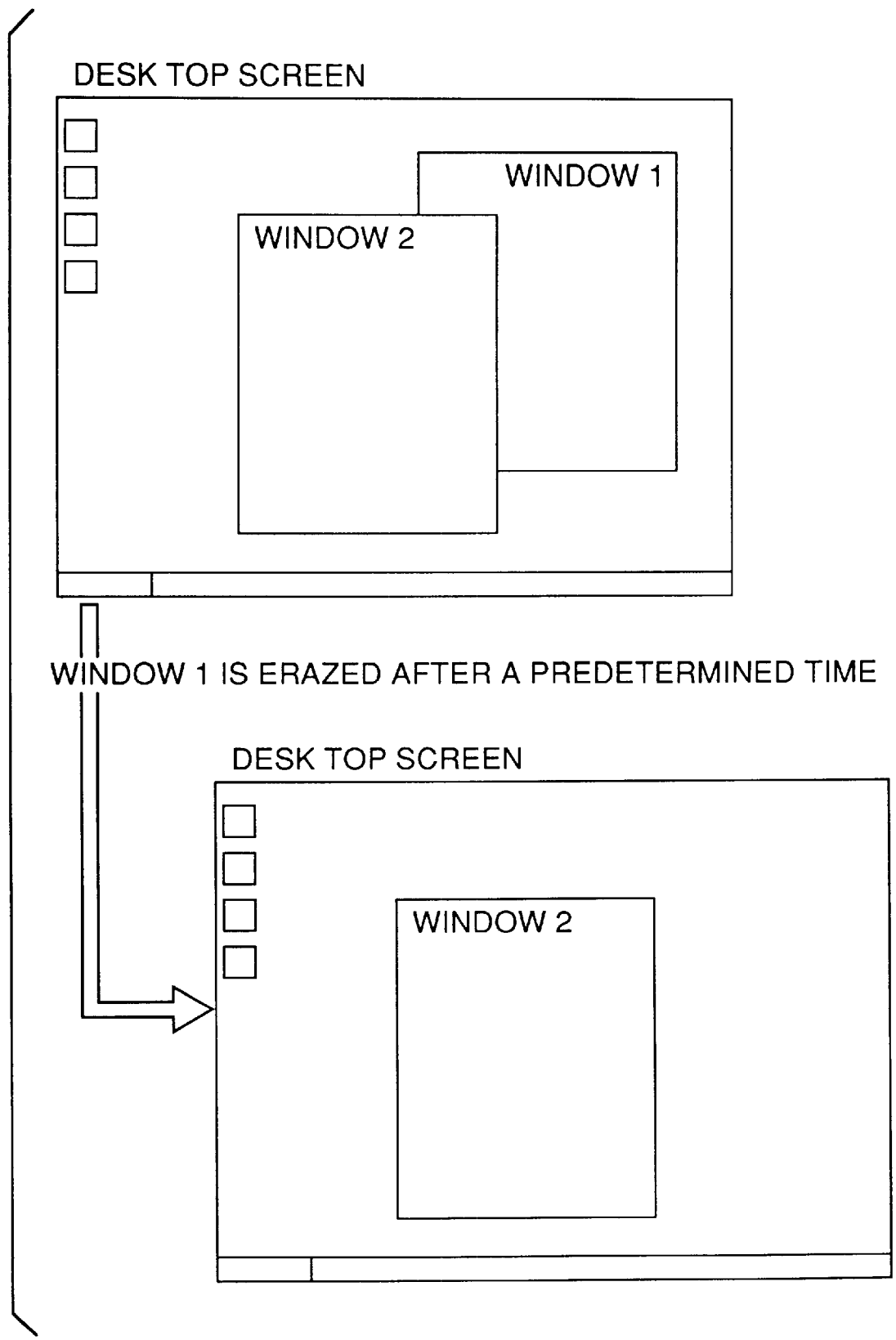
FIG. 5 is a diagram, in a multi-window display system of the present invention, showing before and after erasure of the partially hidden first window.

When the user starts a window and modifies the size or the location of a window, the position of the focus is moved on the window and the window is displayed on the uppermost layer of all windows open at present as the working windows. Thus, there are some windows, which are covered partially or totally by the window displayed on the uppermost layer and some windows are left uncovered by the uppermost window. At this time, with reference to a data base which stores the overlapping information of all windows displayed on the screen, the windows which are partially or totally covered (i.e., "overlapped") by the uppermost window are erased (i.e., "minimized"), if the data base is not updated for a predetermined period of time, as shown in FIG. 5. That is, FIG. 5 is a diagram showing the change that a covered and underlying window 1 is erased.

The fact that the data base is not updated for a predetermined period of time implies that the user has completed the modification of the size or the location of the newly started window and the user is ready to carry out an operation. Since the system of the present invention is operated based on a window that is focused, when reopening the window which has been previously erased is desired, it is possible to use a mechanism such as a task bar provided with the operating system. That is, when the focus is shifted to the other window, the focused window is re-displayed. That is, the task bar is the mechanism capable of displaying a view of all windows open at present or switching windows; thus, by the same procedure, a window can be re-displayed by use of the task bar when the focus is shifted to the other window. Consequently, the indication of only one or a plurality of windows necessary for the user's operation and erasure of other unnecessary windows allow improving the visibility of the windows for the user's operation.

Figure 6:
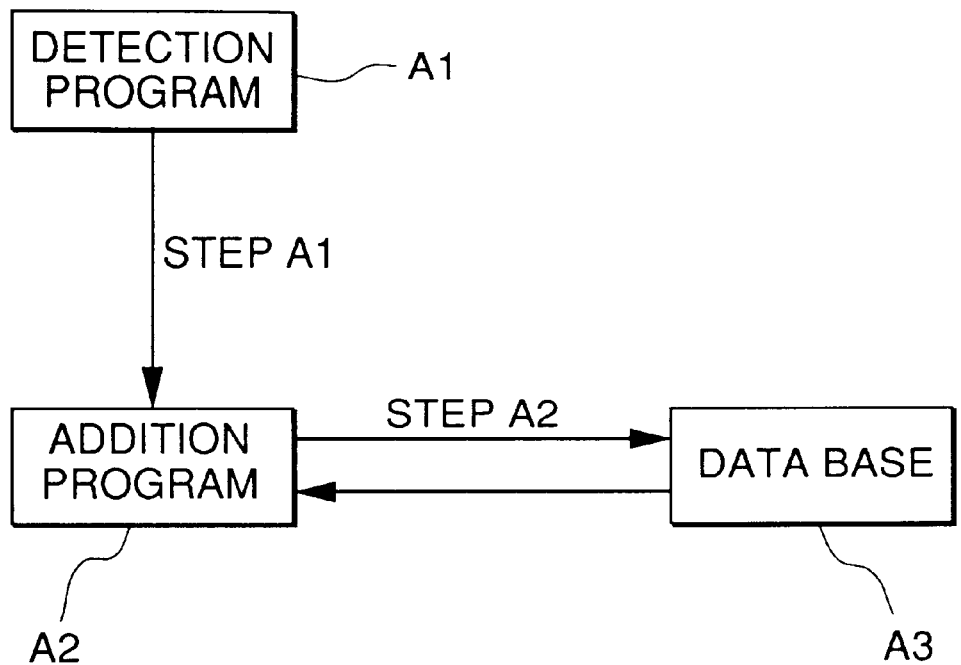
FIG. 6 is a flow chart for detecting positional information of all of opened windows on the screen and degrees of mutual overlapping of these windows, when a focus detects a window.
Figure 7:
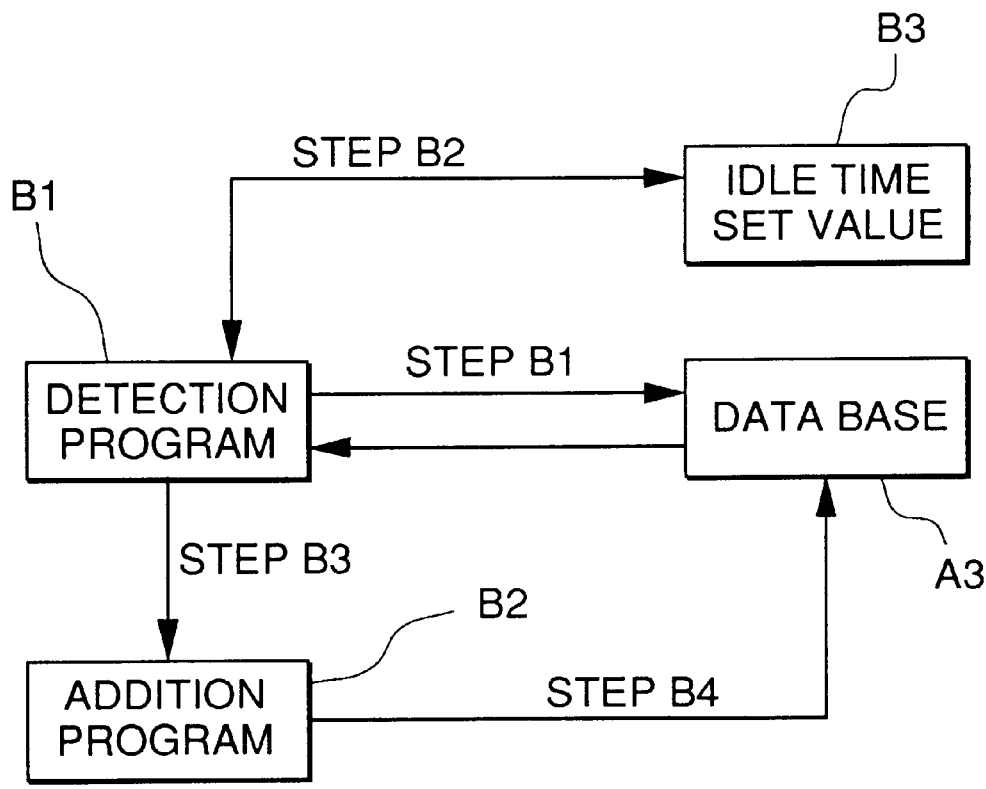
FIG. 7 is a flow-chart for erasing an unnecessary window by a timer which monitors updating of a data base.

Hereinafter, the embodiment of the present invention is described in detail. First, the structure of the embodiment is described. FIG. 6 is a flow chart for detecting the positional information of all open windows and the degree of overlap with other windows, at the time when the focus detects a window. FIG. 7 is a flow-chart for erasing unnecessary windows by a timer which monitors whether a data base is updated.

An automatic display and erasing system in the multi-window display system in one embodiment of the present invention comprises a program A1 for detecting the focused window which is focused on at present (detection program), a program A2 for detecting a location of the focused window and adding information on the presence of mutually overlapping windows to the data base (addition program), and a data base for storing information related to positional information of all windows which are opened at present, the presence of mutually overlapping windows, and information as to whether or not windows are displayed. Furthermore, as shown in FIG. 7, the embodiment further comprises a program B1 for detecting whether or not the data base is updated (timer program), a program B2 for erasing windows whose display is judged to be unnecessary (erasure program), and an idle-time set value B3, which can be set by a user, and which sets the time until the unnecessary window is erased.

Next, an operation of the embodiment of the present invention will be described hereinafter with reference to flow charts shown in FIGS. 6 and 7. As shown in FIG. 6, the program A1 (detection program) detects a window which is newly focused and transfers the control to the program A2 (addition program). In the program A2 (addition program), positional information of the newly focused window is detected, the presence of the overlap of the new window with other windows is calculated from positional information of all registered windows and the new window, and, if the new window is a newly produced window, the new window is added to the data base, and if the new window is already registered in the data base, the existing data base is updated (step A2).

As shown in FIG. 7, the program B1 (the timer program) always monitors the data base A3. If the data base A3 is updated, the program B1 clears the internal timer value of the program B1 (step B1), makes repetitive comparisons of the internal timer value with the idle-time set value B3 (step B2), and the control is transferred to the program B2 (the erasure program), if the data base A3 is not newly updated by the time that the internal timer value exceeds the time set value B3. Finally, in program B2 (the erasure program), information is obtained as to whether or not the window on the screen is an object for erasure, that is, as to whether or not the window on the screen overlaps the newly focused window, and if the window on the screen is an object for erasure, the window is erased (step B4).

Figure 8:
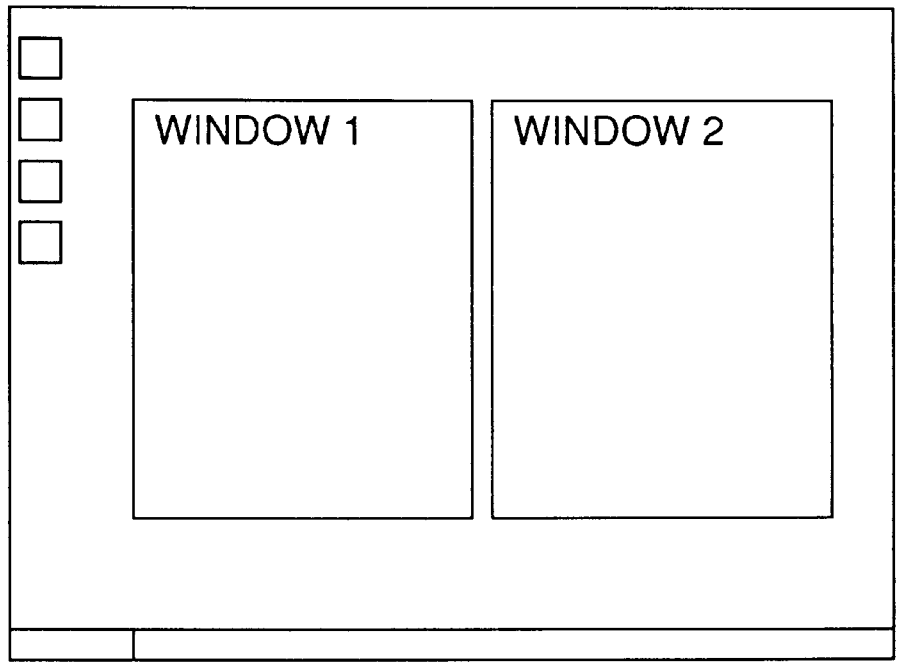
FIG. 8 is a diagram showing the first display screen for explaining a process flow of the multi-window display according to one embodiment of the present invention.
Figure 9:
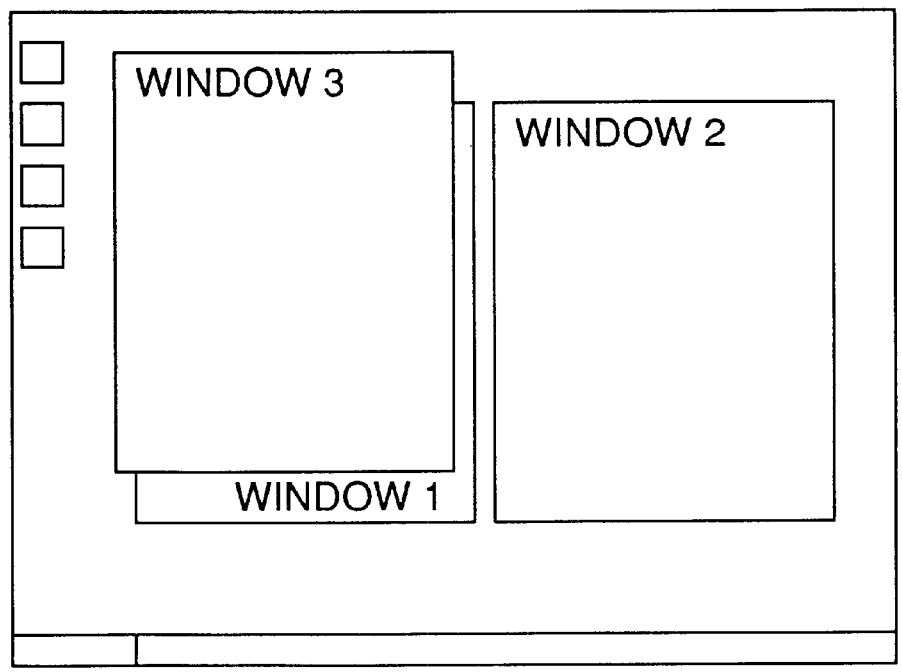
FIG. 9 is a diagram showing a display screen in which a new window is overlapped on one of two windows shown in FIG. 8.
Figure 10:
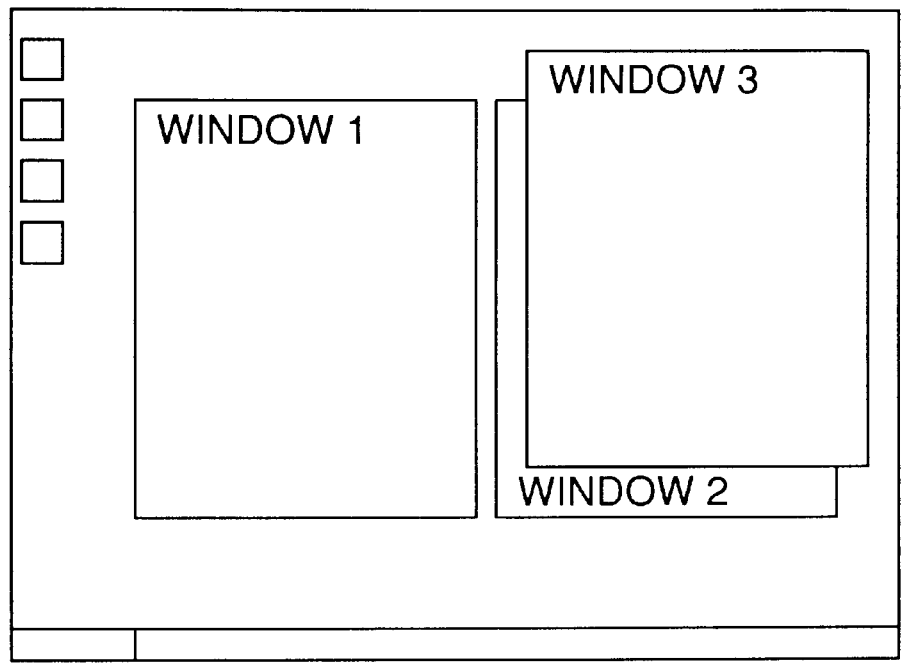
FIG. 10 is a diagram showing a display screen in which a new window is overlapped on another one of two windows shown in FIG. 8.
Figure 11:
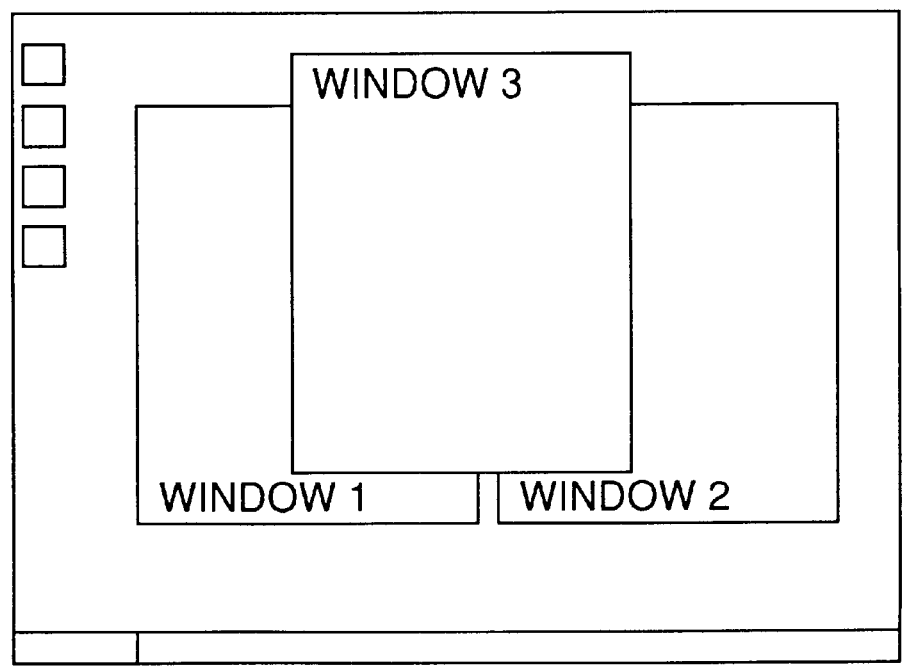
FIG. 11 is a diagram showing a display screen in which a new window is overlapped riding on both two windows shown in FIG. 8.

An practical example is described below. FIG. 8 is a diagram showing the first display screen for explaining a flow of the multi-window display processing according to the embodiment of the present invention. FIG. 9 is a diagram showing a display screen in which a new window overlaps one of two windows shown in FIG. 8. FIG. 10 is a diagram showing a display screen in which a new window overlaps another one of two windows shown in FIG. 8. FIG. 11 is a diagram showing a display screen in which a new window overlaps two adjacent windows shown in FIG. 8.

First, it is assumed that two windows C1 and C2 are displayed on the screen as the user's working space as shown in FIG. 8. The user is working on the window C2 referring to the data shown in the window C1. Assume that it becomes necessary for the user to work on the window C2 with reference to information provided by the window C3, and the user no longer needs information of the window C1.

There are three following cases when the window C3 is displayed on the screen: (1) the window C3 is overlapping the window C1 but not overlapping the window C2, as shown in FIG. 9, (2) the window C3 is overlapping the window C2, but not overlapping the window C1, as shown in FIG. 10, and (3) the window C3 is overlapping riding on both windows C1 and C2, as shown in FIG. 11.

In the case shown in FIG. 9, both windows C3 and C2 required for the user's operation are displayed on the screen without overlap, and the unnecessary window C1 is covered by the window C3. Under this condition, since the necessary windows are displayed on the screen, the user can start the operation on the window C2 when the focus is moved to the window C2 without necessitating modification of size or locations of windows.

The movement of the focus to the window C2 allows executing steps A1 and A2 shown in FIG. 6 and step B1 shown in FIG. 7. After then, step B2 is executed and, when the operation on the window C2 continues until a time exceeding the time set value B3, step B3 shown in FIG. 7 is executed, and the unnecessary window C1 is erased from the screen by executing step B2 shown in FIG. 7.

In the case shown in FIG. 10, since the windows C3 and C2 necessary for the next operation overlap, the user needs to change the windows for the next operation. In general, when two windows overlap on the screen, the user generally makes an attempt to rearrange the windows C3 and C2 to be displayed in parallel without overlap by transferring the window C3 on the left hand of the window C2, so as to realize the screen shown in FIG. 9. However, since the multi-window display system according to the embodiment of the present invention defines the idle-time set value B3, if the rearrangement is carried out for realizing the screen shown in FIG. 9 within the idle-time value B3, the step B3 in FIG. 7 is generated and any windows will never erased. Thus, an operation to erase the window indication shown in FIG. 9 is executed in the present embodiment.

The case shown in FIG. 11 can be considered as a transition state from FIG. 10 to FIG. 9. Accordingly, in order to dissolve the overlap of the two windows C3 and C2, it is necessary to transfer the window C3 so as to realize the screen shown in FIG. 9, in which both windows are placed in parallel without overlapping. The steps shown above to realize the screen of FIG. 9 are executed.

As described above, the multi-window display system of the present invention exhibits the first effect that, since the windows selected only as the operational object by the user are displayed on the screen and other unnecessary windows are automatically erased, the operator can concentrate on the contents of the operational windows. The second effect of the present system is that only necessary windows are displayed and unnecessary windows can be automatically erased without imposing a burden on the user in selection or erasure of windows, while the conventional systems usually need the user to execute closure, minimization, or size reduction of unnecessary windows, excluding windows necessary for processing. Furthermore, since the present invention allows re-display by the use of a task bar, the time for re-activating an application can be saved. The third effect of the present invention is that, the present system can maintain an automatic display and erasure condition of windows so as to be able to respond to any user's demands, that is, it is possible to respond to a user's desires to work while opening a plurality of windows simultaneously on the screen.

What is claimed is:

1. A multi-window display system for displaying a plurality of windows on a display device, comprising:
   a detection program for detecting a focused window among said plurality of windows displayed on said display device, said focused window being one of at least two top-most windows of said plurality of windows;
   a database for storing information related to at least one of locations of said plurality of windows displayed on said display device, information about overlapped ones of said plurality of windows and information about currently minimized windows;
   a program for detecting location information of said focused window, for detecting overlapped ones of said plurality of windows, and for updating information in said database about ones of said plurality of windows that are overlapped by said focused window based on said detected location information of said focused window and said detected overlapped ones of said plurality of windows;
   a timer program for detecting if said database is updated within a set time period; and
   a minimization program for minimizing particular ones of said plurality of windows displayed on said display device, based on said detected location information of said focused window and said detected overlapped ones of said plurality of windows, when said database has not been updated within said set time period, said particular ones being only those that are at least partially overlapped by said focused window.

2. The multi-window display system recited in claim 1, wherein a minimized window can be redisplayed by executing a task bar function which shifts focus to said minimized window.

3. A multi-window display system for displaying a plurality of windows on a display device, comprising:
   a detection program for detecting a focused window among said plurality of windows displayed on said display device, said focused window being one of at least two top-most windows of said plurality of windows;
   a database for storing information related to at least one of locations of said plurality of windows displayed on said display device, information about overlapped ones of said plurality of windows and information about currently minimized windows;
   a program for detecting location information of said plurality of windows displayed on said display device, for detecting overlapped ones of said plurality of windows, and for updating information in said database about ones of said plurality of windows that are at least partially overlapped by other ones of said plurality of windows;
   a timer program for detecting if said database is updated within a set time period; and
   a minimization program for minimizing only said ones of said plurality of windows that are at least partially overlapped by other ones of said plurality of windows, based on said detected location information of said focused window and said detected overlapped ones of said plurality of windows, when said database has not been updated within said set time period.

4. The multi-window display system recited in claim 3, wherein a minimized window can be redisplayed by executing a task bar function which shifts focus to said minimized window.

5. A multi-window display system for displaying a plurality of windows on a display device, comprising:
   a detection function for detecting a focused window among said plurality of windows displayed on said display device, said focused window being one of at least two top-most windows of said plurality of windows;
   a memory for storing information related to locations of said plurality of windows displayed on said display device, information about overlapped ones of said plurality of windows and information about currently minimized windows;
   an adding function for detecting location information of said plurality of windows displayed on said display device, for detecting overlapped ones of said plurality of windows, and for adding information about ones of said plurality of windows that are at least partially overlapped by other ones of said plurality of windows;
   an update function for detecting if said memory is updated;
   a timer function for determining an elapsed time period since said memory was last updated;
   a comparing function for comparing said elapsed time period with a predetermined time period; and
   a minimization function for determining if said memory has been updated within said predetermined time period and for minimizing only ones of said plurality of windows displayed on said display device that are at least partially overlapped by other ones of said plurality of windows, based on said detected location information of said focused window and said detected overlapped ones of said plurality of windows, when said memory has not been updated within said predetermined time period.

6. The multi-window display system recited in claim 5, wherein a minimized window can be redisplayed by executing a task bar function which shifts focus to said minimized window.

7. A method of displaying and minimizing windows in a multi-window display system, comprising:

displaying a plurality of windows on a display device, said focused window being one of at least two top-most windows of said plurality of windows;

detecting location information of said plurality of windows displayed on said display device;

automatically detecting that at least one of said plurality of windows displayed on said display device is overlapped by at least one other of said plurality of windows displayed on said display device;

setting a predetermined time period for updating said location information;

determining if said location information has been updated within said predetermined time period; and minimizing particular ones of said plurality of windows displayed on said display device, based on said automatic detection, when said location information has not been updated within said predetermined time period, said particular ones being only those that are at least partially overlapped.

8. The method recited in claim 7, further comprising storing said location information in a memory.

9. The method recited in claim 7, further comprising storing said location information in a database.

10. The method recited in claim 7, further comprising:

detecting a newly focused window among said plurality of windows displayed on said display device; and adding location information of said newly focused window to a database if said newly focused window is a new window or updating said location information of said newly focused window in said database if said newly focused window has previously been added to said database.

11. The method recited in claim 7, wherein determining if said location information has been updated within said predetermined time period comprises monitoring a database containing said location information to determine if said location information is updated within said predetermined time period.

12. The method recited in claim 7, wherein setting a predetermined time period for updating said location information comprises setting an idle-time value to be compared with an elapsed time period since said location information was last updated.

13. The method recited in claim 12, wherein said idle-time value is compared with said elapsed time period on a continuous basis.

14. The method recited in claim 12, wherein said elapsed time period is determined by an internal timer.

15. The method recited in claim 14, further comprising resetting said internal timer if said location information is updated prior to said predetermined time period.

16. A method of displaying and minimizing windows in a multi-window display system, comprising:

displaying a plurality of windows on a display device such that at least one of said plurality of windows is overlapped at least partially by at least one other of said plurality of windows and such that each of at least two windows of said plurality of windows are top-most windows;

detecting location information of said plurality of windows displayed on said display device;

detecting that the at least one of said plurality of windows is overlapped at least partially by the at least one other of said plurality of windows;

setting a predetermined time period for updating said location information;

determining if said location information has been updated within said predetermined time period; and minimizing only said at least one of said plurality of windows at least partially overlapped by said at least one other of said plurality of windows, based on said overlap detection, when said location information has not been updated within said predetermined time period.

17. The method recited in claim 16, further comprising storing said location information in a memory.

18. The method recited in claim 16, further comprising storing said location information in a database.

19. The method recited in claim 16, wherein determining if said location information has been updated within said predetermined time period comprises monitoring a memory containing said location information to determine if said location information is updated within said predetermined time period.

20. The method recited in claim 16, wherein setting a predetermined time period for updating said location information comprises setting an idle-time value to be compared with a time period which has elapsed since said location information was last updated.

* * * * *